July 25, 1967 — E. S. GANDRUD — 3,332,727
SELF-ALIGNING BEARING
Filed March 23, 1965 — 2 Sheets-Sheet 1
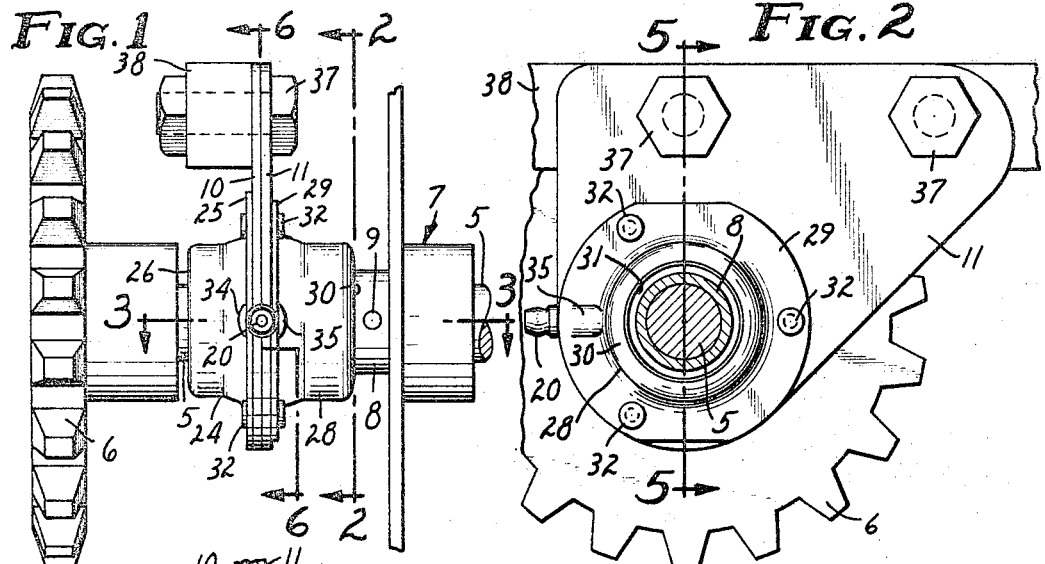
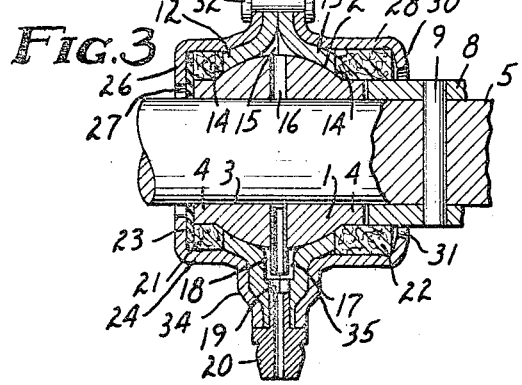
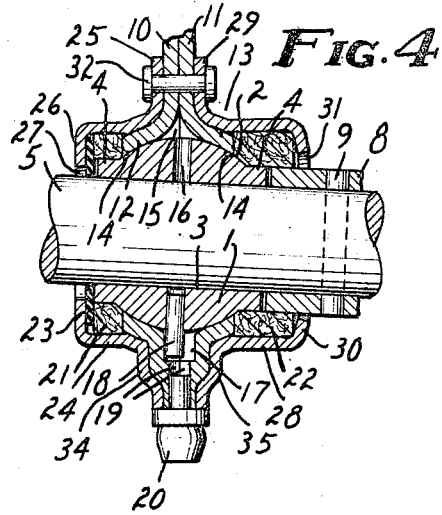
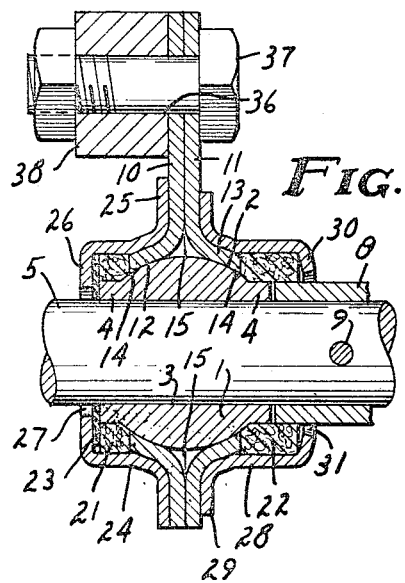
INVENTOR.
EBENHARD S. GANDRUD
BY
Merchant, Merchant & Gould
ATTORNEYS July 25, 1967
E. S. GANDRUD
3,332,727
SELF-ALIGNING BEARING
Filed March 23, 1965
2 Sheets-Sheet 2
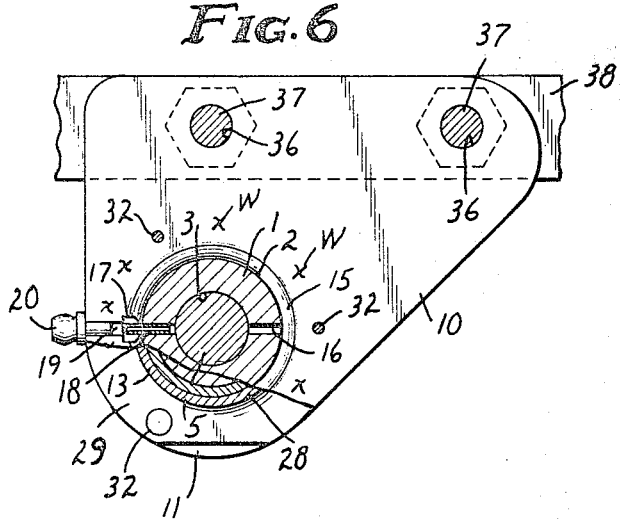
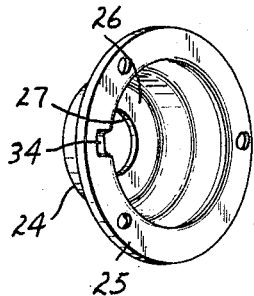
INVENTOR.
EBENHARD S. GANDRUD
BY
Merchant, Merchant & Gould
ATTORNEYS 3,332,727
SELF-ALIGNING BEARING
Ebenhard S. Gandrud, c/o Gandy Co., P.O. Box 528,
Owatonna, Minn. 55060
Filed Mar. 23, 1965, Ser. No. 441,962
5 Claims. (Cl. 308—72)

ABSTRACT OF THE DISCLOSURE

A self-aligning bearing including a pair of mounting plates formed to provide opposed bearing retainer sockets for reception of a bearing element having an axial bore and a spherical outer surface portion engaging the sockets, the plates and bearing element defining lubricant receiving means, a key limiting rotary and angular movement of the bearing element, and sealing means for the bearing element.

Background of the invention

While self-aligning bearings have been in use for an extended period of time, most of these have been of the rolling friction variety, using metal balls between bearing races, the races requiring special mounting means, and the entire assemblies being of rather high cost. Self-aligning sleeve bearings have also been produced for given particular installations and designed for use only in these installations.

Summary of the invention

The self-aligning bearing of my invention is adapted for use on any structure having a surface to which the bearing may be screwed or bolted. The bearing comprises, a bearing element having an axial shaft-receiving bore and a spherical outer surface portion coaxial with the bore, a pair of cooperating mounting plates secured together in face-to-face engagement and formed to provide opposed bearing retainer sockets slidably fitting the spherical surface portion of the bearing element and having aligned openings normally aligned with the bore in the bearing element. The bearing element and mounting plates define an annular chamber for lubricant, the chamber having an enlarged recess portion. The bearing element is provided with a tubular key that extends radially outwardly thereof into the recess to limit rotary and angular movement of the bearing element in the sockets, the tubular key further operating to conduct lubricant from the chamber to the bore of the bearing element. A pair of annular compressible sealing members engage the sockets and opposite end portions of the bearing element, and a pair of annular shields hold the sealing members against their respective retainer sockets and the bearing element in all angularly disposed positions of the bearing element relative to the mounting plates.

Referring to the drawings, which illustrate the invention, and in which like reference characters indicate like parts throughout the several views:

FIG. 1 is a view in side elevation showing the bearing of this invention mounted on a frame structure and journaling a shaft having a sprocket wheel and rotary member mounted thereon;

FIG. 2 is a fragmentary view, partly in section and partly in elevation, taken on the line 2—2 of FIG. 1;

FIG. 3 is an enlarged view in section, taken on the line 3—3 of FIG. 1, some parts being removed;

FIG. 4 is a view corresponding to FIG. 3 but showing a different position of some of the parts;

FIG. 5 is a fragmentary vertical section taken substantially on the line 5—5 of FIG. 2;

FIG. 6 is an enlarged fragmentary view, partly in section and partly in elevation, taken on the line 6—6 of FIG. 1, some parts being broken away;

FIG. 7 is a view in perspective of one of the annular shields of this invention; and FIG. 8 is an exploded view in perspective of the bearing of this invention.

In the producing of various machines having rotary elements, particularly agricultural equipment, various structural members such as angle iron, channel beams and the like, are frequently used, these being usually welded or riveted together. With many of these constructions, it is difficult and expensive to mount rigid bearings in spaced apart relationship to provide perfect alignment between the bearings. While I am aware that self-aligning rolling friction bearings, such as ball bearings, are at present available, there are many instances where bearings of the sleeve or bushing type are more advantageous in operation and can be provided at a substantial saving in cost. A preferred embodiment of my self-aligning bearing is illustrated in the drawings as comprising a bearing element 1 made from suitable bearing material, such as porous bronze or the like. One such bearing material is sold under the trademark "Oilite."

The bearing element 1 is formed to provide a spherical outer surface portion 2, a bore 3 coaxial with the spherical outer surface portion 2, and a pair of cylindrical end portions 4 coaxial with the bore 3 and spherical surface portion 2. As shown in FIGS. 1–6 and 8, a shaft 5 is rotatably received in the bore 3, a conventional sprocket wheel 6 being mounted fast on the shaft 5 axially outwardly of one end of the bearing element 1, and a rotary member, indicated generally at 7, being mounted on the shaft 5 axially outwardly of the opposite end of the bearing element 1, the rotary member 7 including a hub portion 8 having a drive pin 9 extending diametrically therethrough and through a portion of the shaft 5, see particularly FIGS. 1 and 3.

A pair of plate-like mounting members 10 and 11 are formed at their lower end portions to provide a pair of opposed annular retainer sockets 12 and 13 respectively, that are shaped to slidably fit the spherical surface portion 2 of the bearing element 1, the retainer sockets 12 and 13 defining openings 14 through which opposite end portions of the bearing 1 project. The plate-like mounting members 10 and 11 are anchored together in face-to-face engagement by spot welding or the like, indicated at W in FIGS. 6 and 8, radially outwardly of the retainer members 12 and 13, to permanently mount the bearing element 1 in the retainer sockets 12 and 13. It will be noted that the openings 14 are of a diameter greater than that of the cylindrical end portions 4 of the bearing element 1 and less than the diameter of the spherical surface portion 2 of the bearing element.

The plate-like mounting members 10 and 11 are preferably of heavy gauge sheet metal stamped and formed to provide their respective retainer sockets 12 and 13 and the openings 14 therein. Adjacent portions of the retainer sockets 12 and 13 cooperate with a portion of the spherical surface 2 of the bearing element 1 to define an annular chamber 15 for suitable lubricant, such as grease or the like, not shown. While some of the lubricant in the annular chamber 15 seeps through the pores of the bearing element 1 to the bore 3 therein, the bearing element 1 is further provided with a pair of aligned radial openings 16 that extend from the bore 3 to the annular chamber 15, to conduct lubricant to the bore 3. The mounting members 10 and 11 are formed to provide an enlarged recess 17 in the annular chamber 15 for reception of the radially outer end of a tubular key 18, commonly known as a roll pin, that is pressed into one of the radial openings 16 of a bearing element 1. The diameter of the recess 17 is sufficiently greater than that of the tubular key 18 to permit limited angular and rotary movement of the bearing element 1 relative to the retainer sockets 12 and 13. Not only does the tubular key or roll pin 18 limit said rotary and angular movement of the bearing element 1, but it also provides a passage for lubricant from the annular chamber 15 to the bore 3. Radially outwardly of the recess 17, the mounting members 10 and 11 are formed to provide opposed channels 19 which cooperate to define a passage for lubricant from the exterior to the annular chamber 15. Preferably, the channels 19 are formed by drilling radially inwardly toward the recess 17 from the adjacent edge of the welded together plate-like mounting members 10 and 11. Thus, the transverse dimension of the channels 19 may be accurately controlled so that a conventional grease fitting 20 may be pressed thereinto in the usual manner.

For the purpose of sealing the bearing against entry of dust or other foreign matter, and for preventing loss of lubricant through the openings 14 in the retaining sockets 12 and 13, I provide a pair of annular sealing members 21 and 22 the former of which engages the retainer socket 12 at the opening 14 therein, and encompasses the adjacent spherical surface 2 and cylindrical portion 4 of the bearing element 1, the sealing member 22 engaging the outer end of the retainer socket 13 adjacent the opening 14 therein, and encompassing the spherical surface portion 2 and cylindrical portion 4 extending outwardly therefrom. The sealing members 21 and 22 are preferably made from porous compressible material such as felt or the like. In the construction shown, the sealing member 22 closely encompasses the adjacent end of the hub 8 of the rotary member 7 to prevent dust or other foreign matter from entering the bore 3 at the adjacent end of the bearing element 1. A sealing washer 23 is disposed at the axially outer end of the sealing member 21 and has an inner diameter substantially equal to the diameter of the bore 3 and an outer diameter somewhat less than the outer diameter of the adjacent sealing member 21. The sealing member 21 and adjacent washer 23 are held in place by an annular shield 24 that encompasses the adjacent retainer socket 12 and which, at its inner end is formed to provide a radially outwardly projecting annular flange 25 disposed in face-to-face engagement with the adjacent outer surface of the plate-like mounting member 10. At its axially outer end, the shield 24 is formed to provide a radially inwardly projecting annual flange 26 that engages the sealing washer 23, and which defines an opening 27 normally coaxial with the bore 3 of the bearing element 1. The annular sealing member 22 is similarly held in place by an annular shield 28 that encompasses the adjacent retainer socket 13 and sealing member 22, and which is provided at its axially inner end with a flange 29 similar to the flange 25 and in face-to-face engagement with the adjacent outer surface of the plate-like mounting member 11. At its outer end, the shield 28 is formed to provide a radially inwardly projecting annular flange 30 defining an opening 31 axially aligned with the opening 27 in the shield 24. The flanges 25 and 29 are anchored to the mounting members 10 and 11 by circumferentially spaced rivets or the like 32.

As shown in FIGS. 3, 4 and 8, forming of the recess 17 causes the material of the mounting members 10 and 11 to be laterally bulged about the recess 17, as indicated at 33, see particularly FIG. 8. In order that the flanges 25 and 29 of the shields 24 and 28 respectively be permitted to make face-to-face engagement with the adjacent surfaces of their respective mounting members 10 and 11 throughout the circumferential extent of the flanges 25 and 29, the same are outwardly bulged, as at 34 and 35 respectively to accommodate the bulged portions 33 of the members 10 and 11. Thus, any lubricant which might accumulate within the shields 24 and 28 is effectively prevented from leaking radially outwardly between the flanges 25 and 29 and their adjacent mounting members 10 and 11.

As shown in FIG. 8, the mounting members 10 and 11 are provided with aligned apertures 36 for the reception of nut-equipped mounting bolts or screws 37 by means of which the bearings are mounted on a machine or implement, a portion of which is shown as comprising a mounting bar or frame 38.

It will be noted, with reference to FIG. 4, that the bearing element 1 may be angularly displaced relative to the common axis of the openings 14, 27 and 31, to compensate for inaccuracies or misalignment of a pair of spaced bearings. Not only does the outer end portion of the roll pin 18 limit angular displacement of the bearing element 1 in the retainer sockets 12 and 13, but it also limits rotary movement of the bearing element 1 therein, so that the bearing element 1 is prevented from rotating with the shaft 5 when rotation is imparted thereto. It will be appreciated that the sealing members 21 and 22 are sufficiently soft to permit angular movement of the bearing element 1 and shaft 5 without placing any of the several parts under strain when misalignment of a pair of bearings on a given shaft is present. The sealing washer 23, closely encompassing the shaft 5, effectively prevents entry of dust or foreign matter into the adjacent end of the shield 24, and thus protects the adjacent sealing member 21. The reduced outer diameter of the sealing washer 23 permits the same to be moved radially relative to the shield 24 during angular movement of the bearing element 1 and shaft 5 resulting from misalignment of a pair of cooperating bearings.

This invention has been thoroughly tested and found to be completely satisfactory for the accomplishment of the objectives set forth; and, while I have shown and described a commercial embodiment of my self-aligning bearing, it will be understood that the same is capable of modification without departure from the spirit and scope of the invention, as defined in the claims.

What I claim is:

1. A self-aligning bearing comprising, a bearing element having a spherical outer surface portion and a shaft-receiving bore coaxial with said spherical surface portion, a pair of cooperating mounting plates secured together in face-to-face engagement and having opposed bearing retainer sockets slidably fitting said spherical surface portion of said bearing element, said retainer sockets having aligned openings normally coaxial with said bore and of a diameter substantially larger than the diameter of said bore, said mounting plates adjacent said sockets and said spherical portion cooperating to define an annular chamber lying in a plane transversely of the common axis of said openings, said mounting plates having opposed cross-sectionally semi-cylindrical channels extending radially outwardly from said annular chamber and cooperating to provide a passage for lubricant to said chamber, said mounting plates being formed to define an enlarged recess at the radially inner end of said passage, said bearing element having a radial opening extending outwardly from said bore to said spherical outer surface and in register with said recess, a tubular key mounted in said radial opening and having an outer end portion projecting into said recess and of a diameter substantially smaller than the transverse dimension of said recess, said outer end portion of the key being engageable with the sides of said recess to limit rotary and angular movement of the bearing element relative to said retainer sockets, said tubular key providing a lubricant passage from said annular chamber to said bore, and a pair of annular sealing members encompassing and engaging said bearing element each adjacent a different one of said openings in said retainer sockets.

2. The bearing defined in claim 1 in which said bearing element includes a pair of cylinder end portions coaxial with said bore and having an outer diameter substantially less than the diameter of said aligned openings in said sockets, said sealing members being of compressible porous material and closely encompassing said cylindrical bearing element portions.

3. The bearing defined in claim 1 in further combination with a pair of annular shields, each secured to an opposite one of said mounting plates and each encompassing a different one of said sockets and their respective sealing members, said shields having shaft-receiving openings aligned with the openings in said sockets, each of said shields engaging a respective one of said sealing members to hold the same against their respective sockets and said bearing element.

4. The bearing defined in claim 3 in which said shields include, generally cylindrical portions, radially outwardly projecting annular flanges at the inner ends of the generally cylindrical portions, and radially inwardly projecting annular flanges at the outer ends of said generally cylindrical portions defining said shaft-receiving openings in the shields, said outwardly projecting flanges being rigidly anchored to said mounting plates adjacent said sockets.

5. A self-aligning bearing comprising, a bearing element having a spherical outer surface portion and a shaft-receiving bore coaxial with said spherical surface portion, a pair of cooperating mounting plates secured together in face-to-face engagement and having opposed bearing retainer sockets slidably fitting said spherical surface portion of said bearing element, said retainer sockets having aligned openings normally coaxial with said bore and of a diameter substantially larger than the diameter of said bore, said mounting plates adjacent said sockets and said spherical portion cooperating to define an annular chamber lying in a plane transversely of the common axis of said openings, said mounting plates having opposed channels extending radially outwardly from said annular chamber and cooperating to provide a passage for lubricant to said chamber, said mounting plates being formed to provide an enlarged recess in said annular chamber, and a key having means defining a passage longitudinally therethrough projecting radially outwardly from said bore and through said bearing element into said recess for limiting rotary and angular movements of said bearing element relative to said retainer sockets, said key defining a lubricant passage from said annular chamber to said bore.

References Cited
UNITED STATES PATENTS

| | | | |
|---|---|---|---|
| 2,083,688 | 6/1937 | Clements | 308—132 |
| 2,233,880 | 3/1941 | Ballman | 308—134.1 |
| 2,290,213 | 7/1942 | Shafer | 308—194 |
| 2,423,684 | 7/1947 | Collito | 308—72 |
| 2,681,259 | 6/1954 | White | 308—72 |
| 2,739,852 | 3/1956 | Levy | 308—132 X |

MARTIN P. SCHWADRON, *Primary Examiner.*

R. F. HESS, *Assistant Examiner.*